(12) United States Patent
Lindquist et al.

(10) Patent No.: US 7,673,835 B2
(45) Date of Patent: Mar. 9, 2010

(54) TELESCOPING COVER FOR CABLE TROUGH SYSTEM

(75) Inventors: Ryan Lindquist, Shakopee, MN (US);
Derek Sayres, Lonsdale, MN (US);
Chris Eiden, Glencoe, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/327,260

(22) Filed: Dec. 3, 2008

(65) Prior Publication Data

US 2009/0189025 A1    Jul. 30, 2009

Related U.S. Application Data

(60) Provisional application No. 61/012,320, filed on Dec. 7, 2007.

(51) Int. Cl.
*F16L 3/00* (2006.01)
(52) U.S. Cl. .......................................... 248/49; 174/209
(58) Field of Classification Search ................... 248/49, 248/68.1; 174/48, 66, 135, 482, 68.1, 209
See application file for complete search history.

(56) References Cited

U.S. PATENT DOCUMENTS

| | | | |
|---|---|---|---|
| 5,067,678 | A | 11/1991 | Henneberger et al. |
| 5,316,243 | A | 5/1994 | Henneberger |
| 5,752,781 | A | 5/1998 | Haataja et al. |
| 6,107,576 | A * | 8/2000 | Morton et al. ............... 174/101 |
| 6,631,875 | B1 | 10/2003 | Kampf et al. |
| 6,715,719 | B2 | 4/2004 | Nault et al. |
| 6,739,795 | B1 | 5/2004 | Haataja et al. |
| 6,810,191 | B2 * | 10/2004 | Ferris et al. .................. 385/134 |
| 6,835,891 | B1 | 12/2004 | Herzog et al. |
| 6,916,986 | B1 | 7/2005 | Herzog et al. |
| 7,041,897 | B2 | 5/2006 | Herzog |
| 2003/0089515 | A1* | 5/2003 | Federspiel et al. ............. 174/48 |
| 2007/0235212 | A1* | 10/2007 | Waldorf et al. ............... 174/209 |

FOREIGN PATENT DOCUMENTS

| | | | | |
|---|---|---|---|---|
| DE | 42 18 490 C1 | | 9/1993 | |
| EP | 1 160 949 A2 | | 12/2001 | |
| FR | 2686141 | * | 7/1993 | ................... 248/49 |
| WO | WO 9323964 | * | 11/1993 | ................... 248/49 |

OTHER PUBLICATIONS

FiberGuide® Fiber Management Systems, *ADC Telecommunications, Inc.*, pp. 1-34 (Jun. 1998).
U.S. Appl. No. 12/327,637, filed Dec. 3, 2008 entitled "Flexible Cover for Cable Trough System" Inventors: Sayres et al.

* cited by examiner

*Primary Examiner*—Ramon O Ramirez
(74) *Attorney, Agent, or Firm*—Merchant & Gould P.C.

(57) ABSTRACT

Systems and methods for covering a trough member. A cover system can include a static portion coupled to a side wall of the trough member and defining a pocket. A sliding portion is selectively received in the pocket and is movable between an extended position and a retracted position. Opposite side walls of the trough member each include a static portion, and a sliding portion which telescopes to provide access to an interior of the trough member.

13 Claims, 3 Drawing Sheets

TELESCOPING COVER FOR CABLE TROUGH SYSTEM

CROSS REFERENCE TO RELATED APPLICATION

This application claims the benefit of U.S. Provisional Patent Application Ser. No. 61/012,320, filed Dec. 7, 2007, which application is hereby incorporated by reference in its entirety.

FIELD OF THE INVENTION

This application relates to a system for the management and routing of cables, such as telecommunications cables. More particularly, this invention pertains to troughs, fittings, and couplings for the system.

BACKGROUND OF THE INVENTION

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Copper cables, hybrid cables or other transmission cables also need proper management and protection.

When routing optical fibers, it is desirable that a routing system will be easy to assemble, readily accessible and adaptable to changes in equipment needs. Accordingly, such routing systems include a plurality of trough members such as troughs and couplings for forming the cable routing paths. The trough system members are joined together by couplings. U.S. Pat. No. 5,067,678 to Henneberger et al dated Nov. 26, 1991 concerns a cable routing system that includes a plurality of troughs and fittings. The '678 patent further discloses a coupling (element 250 in FIG. 1 of the '678 patent) for joining trough members and fittings. With best reference to FIGS. 6-7 of the '678 patent, a plurality of hardware is disclosed for joining the trough members. U.S. Pat. Nos. 5,316,243; 5,752,781 and 6,715,719 show additional examples of couplings. U.S. Pat. No. 6,631,875 shows a cable trough system with various separate components joined together to assemble the system.

Various systems and methods are known for providing a cover over the trough members or other system components. U.S. Pat. Nos. 6,810,191; 6,835,891; 7,041,897 and 6,916,986 show various covers for positioning over trough members.

Several concerns arise with cable routing systems, including the ease of manufacture and installation of the troughs, couplings, and fittings, and the adequacy of the size of the system components to handle the number of cables in the system. Having enough space for the cables passing through the system is a particular concern as higher and higher densities are desired. There is a need for continued development of cable management systems.

SUMMARY OF THE INVENTION

A telecommunications cable system includes trough members including a cover system. Generally, a cover is coupled to the trough members to cover the trough members. The cover includes a static portion mounted to one or both of the side walls of the trough members, and a movable portion which slides relative to the static portion to provide access to the interior portions of the trough members. In one preferred embodiment, a static portion is mounted to each side wall of a lateral trough, and a slideable portion slides toward and away from an opposite slideable portion to cover, and to provide selective access to the interior of the lateral trough.

In accordance with one aspect, the static portion defines a pocket, and the sliding portion is selectively received in the pocket of the static portion between open and closed positions.

DETAILED DESCRIPTION OF THE PREFERRED EMBODIMENTS

Figure 1:
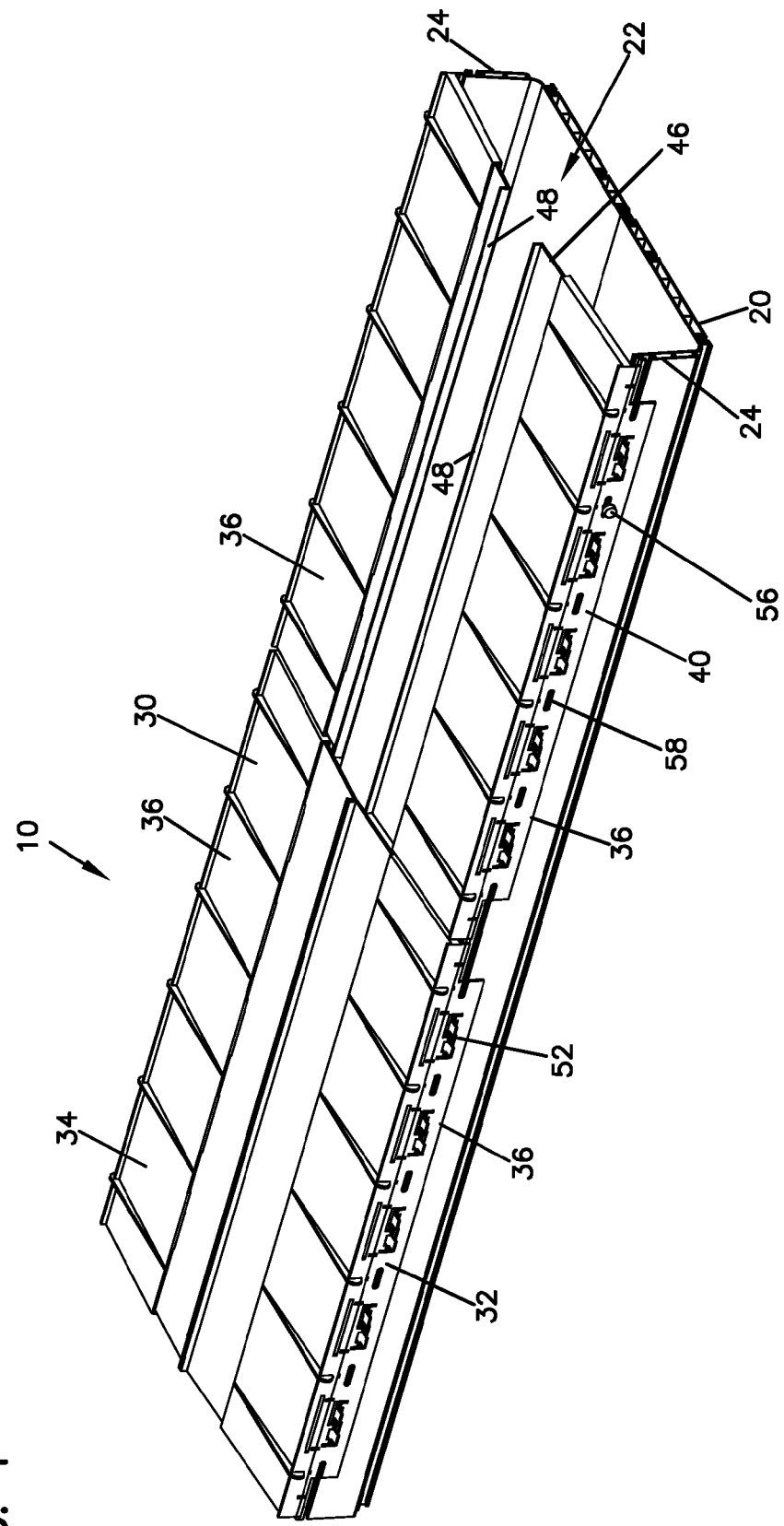
FIG. 1 is a perspective view of an embodiment of a trough system with a cover showing portions of the cover in a closed position, and portions of the cover in a partially open position in accordance with the present invention.

Embodiments of the present invention are directed to covers for cable trough members. Generally, the covers can be coupled to the trough members to cover the trough members. In addition, the covers can be moved with respect to the trough members to provide access to the interior portions of the trough members. As used herein, the term "trough member" is used to refer to any trough, fitting, railway, raceway, or similarly configured component including any number of ends.

Referring now to FIGS. 1-4, an example embodiment of a cable trough system 10 is shown. System 10 generally includes a trough member 20 and a cover 30. Cover 30 includes a sliding portion selectively positionable so as to cover interior portions 22 of trough member 20, or to allow access to interior portions 22 of trough member 20. Trough member 20 includes two side walls 24 and a base or bottom wall 26. Trough member 20 is typically coupled to other troughs or other cable management components for handling telecommunications cables.

Sliding cover 30 preferably includes first and second side portions 32, 34 which cover opposite sides of a longitudinal portion of trough member 20. Side portions 32, 34 can be provided in any length as desired. A plurality of segments 36 can be provided of a suitable length, such as 6 feet, for use in covering trough members 20 having a longer length. If trough members 20 have a shorter length than the length of segments 36 provided, then segments 36 can be cut to length.

Figure 2:
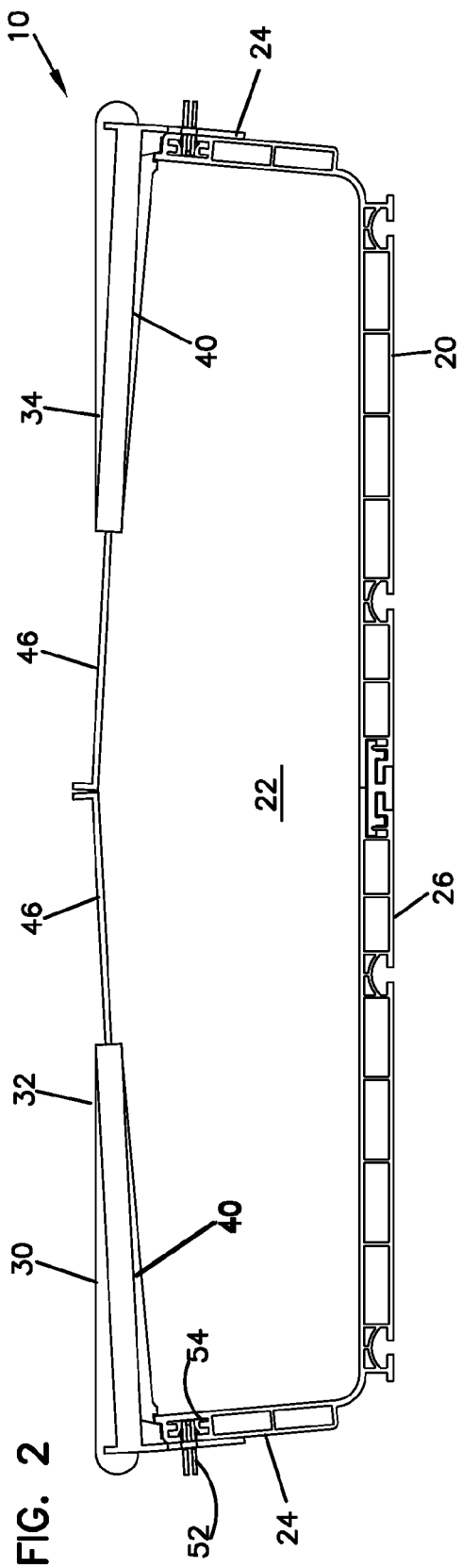
FIG. 2 is an end view of the trough system of FIG. 1, showing the cover in the closed position.
Figure 3:
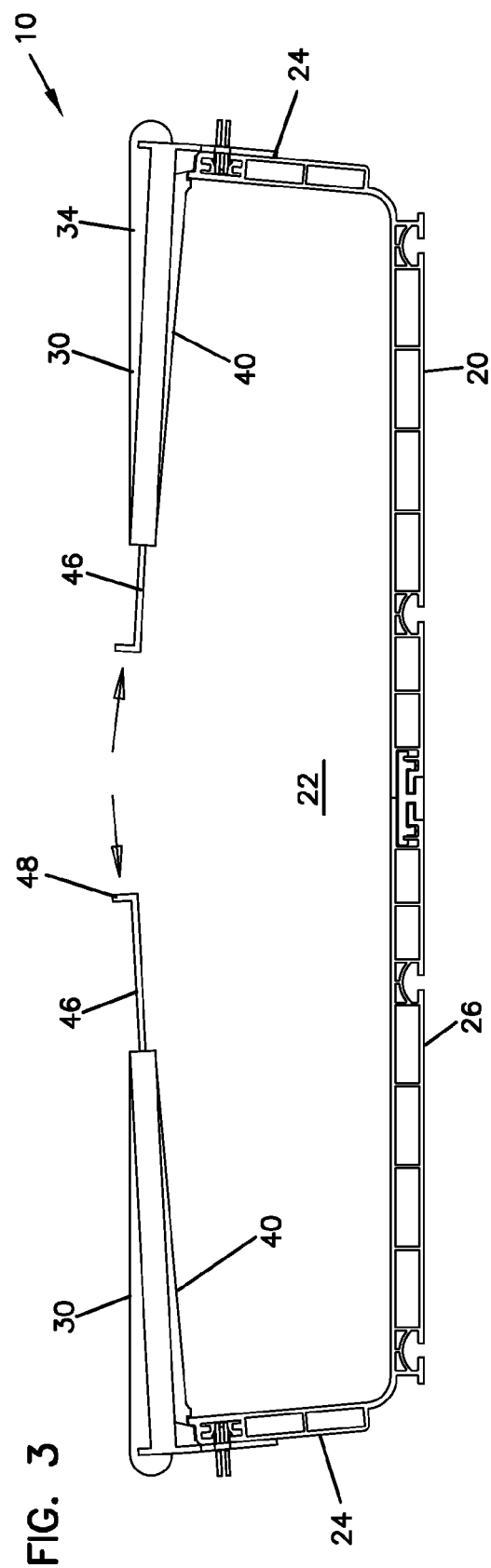
FIG. 3 is an end view of the trough system of FIG. 1 with the cover partially open.

Side portions 32, 34 are generally identically constructed and are mounted opposite to one another in order to cover the width of trough member 20. Side portion 32 will now be described in further detail. A static portion 40 mounts to one of trough member side walls 24. Static portion 40 includes a pocket 42. Side portion 32 further includes a sliding portion 46 selectively received in pocket 42. Sliding portion 46 includes a lip 48 located at a distal end from static portion 40. As shown in FIGS. 1-3, sliding portions 46 are moved relative to static portions 40 to provide selective access to interior portions 22 of trough member 20. Each of side portions 32, 34 telescopes from the closed position (FIG. 2) toward an open position (FIG. 3). As shown in FIG. 3, sliding portions 46 are not fully recessed. In the fully recessed or fully open position, even greater access to interior portions 22 is provided.

It is to be appreciated that sliding portion 46 can include a single piece construction as shown in the figures, or a multi-piece construction which itself telescopes.

Figure 4:
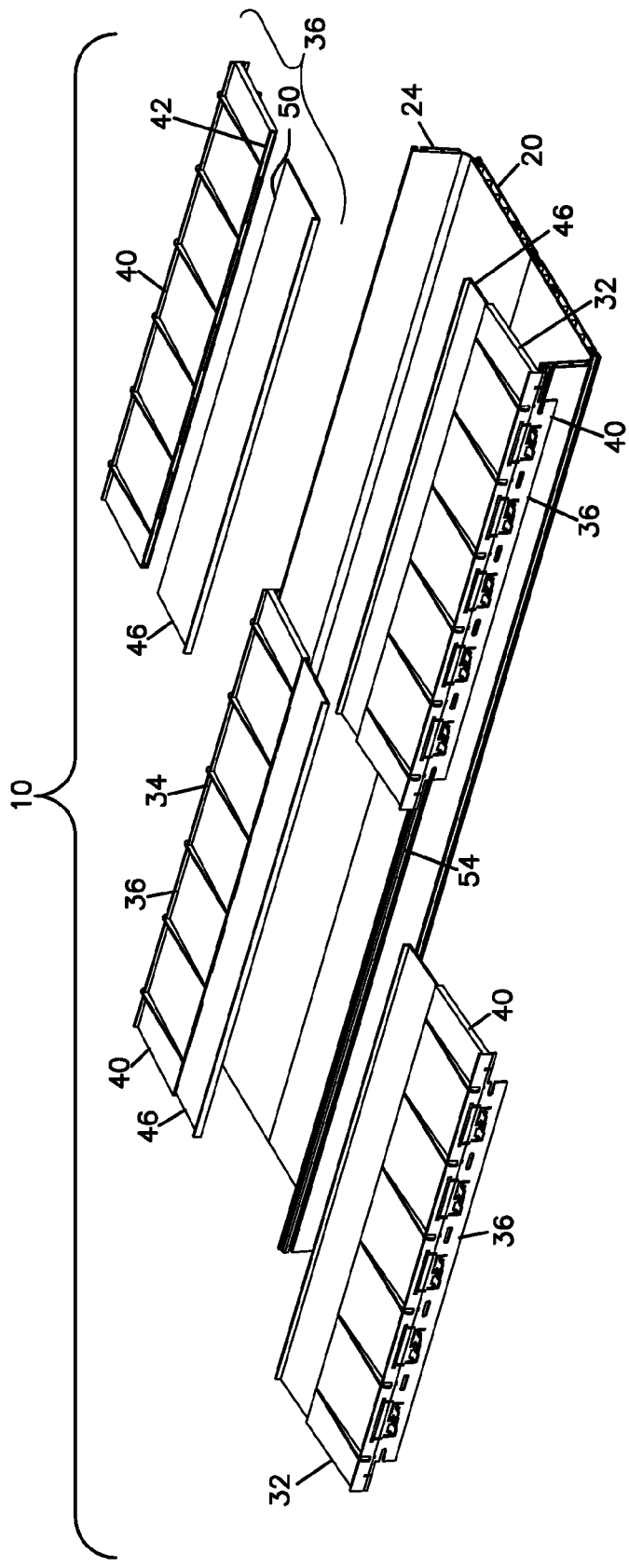
FIG. 4 is an exploded perspective view of the trough system of FIG. 1.

As shown in FIG. 4, sliding portion 46 is separable from static portion 40. If cutting to length is necessary, providing separable parts is advantageous.

In one preferred embodiment, a retention lip or tab can be provided on sliding portion 46 so as to be selectively retained in pocket 42 in the extended position. Such retaining element can be located on a proximal edge 50.

Static portion 40 of cover 30 mounts to trough member 40 adjacent to a top edge 28 of each side wall 24. Various mounting arrangements can be used. One mounting arrangement could include a snap 52 which can be received in slot 54 of side wall 24. Another mounting arrangement could include a fastener 56 received in aperture 58 which is also received in slot 54.

The above specification and examples provide a complete description of the manufacture and use of the invention. Since many embodiments of the invention can be made without departing from the spirit and scope of the invention, the invention resides in the claims hereinafter appended.

What is claimed is:

1. A cover assembly for covering a trough member having a base and a side wall, the assembly comprising:
    a first portion having a generally planar shape which mounts adjacent to a top edge of the side wall, the first portion including a proximal edge adjacent to the side wall, and a distal edge spaced from the proximal edge, the distal edge defining a pocket; and
    a second portion having a generally planar shape slidably received in the pocket between a retracted position and an extended position.

2. The cover assembly of claim 1, wherein the second portion includes a distal end defining a lip.

3. The cover assembly of claim 1, wherein the first portion includes a snap for mounting to the trough member.

4. The cover assembly of claim 1, wherein the first portion includes a fastener for mounting to the trough member.

5. The cover assembly of claim 1, wherein the second portion is separable from the first portion.

6. A cable trough system, comprising:
    a trough member including first and second side walls extending from a base forming a trough;
    a cover assembly including:
        a first portion mounted to each side wall which covers a first portion of the trough member, and a sliding portion which mounts to each first portion for selective movement between a retracted position and an extended position, wherein the sliding portion resides in a pocket defined by the first portion in the retracted position.

7. The cable trough system of claim 6, wherein the sliding portion includes a distal end defining a lip.

8. The cable trough system of claim 6, wherein the first portion mounts to the side wall with a snap.

9. The cable trough system of claim 6, wherein the first portion mounts to the side wall with a fastener.

10. The cable trough system of claim 6, wherein the sliding portion is separable from the first portion.

11. The cable trough system of claim 6, wherein the cover assembly is provided in segments, each segment cooperating to cover the trough, wherein each segment is shorter than the longitudinal dimension of the trough, wherein the segments are arranged end to end, wherein the sliding portions of adjacent segments are separately moveable.

12. A method of covering a trough member having two side walls, the method comprising:
    mounting a first portion onto a first side wall of the trough member;
    mounting a second portion to a second, opposite side wall of the trough member;
    mounting a slideable portion to each of the first and second portions, wherein each slideable portion is movable between a retracted position, and an extended position.

13. The method of claim 12, wherein the first portion, the second portion and the respective slideable portions are provided in segments separate from each other such that the first portion and the second portion of each segment are shorter than the trough member in the longitudinal direction, wherein the slideable portions of adjacent segments are separately moveable.

* * * * *